(12) United States Patent
Hurst-Hiller et al.

(10) Patent No.: US 7,590,619 B2
(45) Date of Patent: Sep. 15, 2009

(54) SEARCH SYSTEM USING USER BEHAVIOR DATA

(75) Inventors: Oliver Hurst-Hiller, Seattle, WA (US); Susan T. Dumais, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 10/805,706

(22) Filed: Mar. 22, 2004

(65) Prior Publication Data

US 2005/0210024 A1 Sep. 22, 2005

(51) Int. Cl.
*G06F 7/00* (2006.01)
*G06F 17/30* (2006.01)

(52) U.S. Cl. .................. 707/3; 707/2; 707/5; 707/1
(58) Field of Classification Search .......... 707/1, 707/5, 100, 101, 2, 3
See application file for complete search history.

(56) References Cited

U.S. PATENT DOCUMENTS

| | | | |
|---|---|---|---|
| 5,446,891 A * | 8/1995 | Kaplan et al. ................. 707/2 |
| 6,434,547 B1 * | 8/2002 | Mishelevich et al. ........... 707/3 |
| 6,490,577 B1 * | 12/2002 | Anwar ........................... 707/3 |
| 6,491,217 B2 * | 12/2002 | Catan .......................... 235/375 |
| 6,507,841 B2 * | 1/2003 | Riverieulx de Varax ........ 707/5 |
| 6,513,031 B1 * | 1/2003 | Fries et al. .................... 707/3 |
| 6,526,440 B1 | 2/2003 | Bharat |
| 6,529,903 B2 | 3/2003 | Smith et al. |
| 6,571,236 B1 * | 5/2003 | Ruppelt ......................... 707/3 |
| 6,619,209 B2 | 9/2003 | Dreher et al. |
| 6,643,639 B2 * | 11/2003 | Biebesheimer et al. ......... 707/3 |
| 6,647,383 B1 * | 11/2003 | August et al. .................. 707/3 |
| 6,658,423 B1 | 12/2003 | Pugh et al. |
| 6,678,681 B1 | 1/2004 | Brin |
| 6,853,998 B2 * | 2/2005 | Biebesheimer et al. ...... 707/101 |
| 7,089,226 B1 * | 8/2006 | Dumais et al. ................. 707/3 |
| 7,158,966 B2 * | 1/2007 | Brill et al. ...................... 707/3 |
| 7,363,282 B2 * | 4/2008 | Karnawat et al. ............. 706/45 |
| 2002/0107843 A1 * | 8/2002 | Biebesheimer et al. ......... 707/3 |
| 2002/0123988 A1 | 9/2002 | Dean et al. |
| 2002/0133481 A1 | 9/2002 | Smith et al. |
| 2002/0152190 A1 * | 10/2002 | Biebesheimer et al. ......... 707/1 |
| 2002/0156776 A1 * | 10/2002 | Davallou ....................... 707/3 |

OTHER PUBLICATIONS

Brin, S. et al., "The Anatomy of a Large-Scale Hypertextual Web Search Engine", *The Anatomy of a Search Engine*, Aug. 7, 2000, Error! Hyperlink reference not valid., 18 pages.

(Continued)

*Primary Examiner*—Apu M Mofiz
*Assistant Examiner*—Brent Stace
(74) *Attorney, Agent, or Firm*—Woodcock Washburn LLP

(57) ABSTRACT

Context-based user behavior data is collected from a search mechanism. This data includes, for a given query, user feedback (implicit and explicit) on the query and context information on the query. This information can be used, for example, to evaluate a search mechanism or to check a relevance model. This context-based user behavior data may include user information. In one embodiment, explicit feedback is requested from the user except when the user requests a pause in explicit feedback requests, or only periodically, in order to reach a target value for requests for explicit feedback. The explicit feedback may include feedback concerning results not visited, and concerning non-standard results. Implicit feedback will include particular data items such as requeries by a user.

14 Claims, 5 Drawing Sheets

OTHER PUBLICATIONS

Claypool, M. et al., "Inferring User Interest", *IEEE Internet Computing*, 2001, 5(6), 32-39.

Gamma, E. et al, "Gang of Four", *Design Patterns: Elements of Reusable Object-Oriented Software*, 1994.

* cited by examiner

SEARCH SYSTEM USING USER BEHAVIOR DATA

CROSS-REFERENCE TO RELATED APPLICATIONS

The subject matter described herein is related to the subject matter disclosed in co-pending U.S. patent application Ser. No. 10/727,444, filed Dec. 3, 2003, entitled "Search System Using User Behavior Data".

FIELD OF THE INVENTION

This invention relates in general to the field of data search and retrieval. More particularly, this invention relates to the collection and use of user behavior data for data search and retrieval.

BACKGROUND OF THE INVENTION

Data stored on one or more computer systems may be useful for a user. However, the stored data may be too extensive for a user to find the data by direct examination. Additionally, some parts of a data repository may contain information that is not accessible to the user. In many cases, in order to allow the user useful access to the data, a search mechanism is provided. The search mechanism allows a user to issue a search request (also termed a search query). The query is executed and the results are returned for the user.

For example, a web-based search engine is a search mechanism that is used to provide search access to information via a web-based search. The information may be found in a specific data repository, such as a database or other data collection. The information may also be an agglomeration of data found in a number of different data repositories. Such a search engine may provide search access to information available from different information providers over a network, such as the Internet.

In a typical usage of a web search engine, the user enters a query, which is a set of search terms related to what the user is looking for. The query is transmitted to the search engine, which attempts to locate "hits"—i.e., content that is available on the Internet and that relates to the terms contained in the query. Generally, the search engine either has a database of web pages that are known to exist, or communicates with external "providers" who maintain such databases; the query is "scored" against items in these databases to identify the web pages that best match the query. A list of results is then generated, and these results are returned to the user's computer for display by the user's web browser.

Typically, the databases contain information such as: the Uniform Resource Locators (URLs) of web pages, the titles of the pages, descriptions of the pages, and possibly other textual information about the web pages. The user then reads the results and attempts to determine, based on the text contained in the results, whether the results correspond to what the user is looking for. Users may then attempt to retrieve the entire page correlating to a search result. In other contexts, search engines present results summarizing the pieces of data that may possibly be useful for a user.

The utility of the search engine is correlated directly to the quality of the results provided. In the best case, the results are presented to the user in order of utility to the user on the result page. Because the quality of the results is subjective, the user's satisfaction must be determined in order to determine whether the quality of the results were satisfactory.

In the prior art, quality of individual web pages has been measured by obtaining explicit feedback from a user. At least one prior art web browser has attempted to obtain such explicit feedback from a user. This browser is described in a paper entitled "Inferring User Interest" by Mark Claypool, David Brown, Phong Le, Makoto Waseda in *IEEE Internet Computing* 5(6): 32-39 (2001). In that browser, different pages are displayed by the browser. Whenever the page being displayed by the browser is changed, a user evaluation of the page is requested from the user. User evaluations for a given page are collected, to determine whether users find that page valuable. In this browser, some implicit feedback is also maintained regarding each page, including data regarding the time spent on the page, mouse movements, mouse clicks, and scrolling time.

While this technique does gather user feedback, it has limited utility in situations in which users may have different needs for a page. For example, a user who is looking for information about books written by Douglas Adams may evaluate a page on his book *The Hitchhiker's Guide to the Galaxy* and give a high score for utility. However, another user who is looking for information on books about traveling cheaply may evaluate the same page and give it a low score. Thus the technique described will have limited utility in the wide variety of situations in which different users may have different needs, or even where a single user may have different needs for information at different times. In other words, the usefulness of this technique is limited because evaluation of each page is completely independent of the context in which the user arrived at the page.

Thus, this technique is not useful for evaluating the quality of a search engine. In general, this technique is not useful for evaluations that are context-based, but only for evaluating the quality of individual data items, independent of the context in which a user arrived at the data items.

Another drawback of the prior art is that users may respond to explicit requests for feedback by ignoring them or providing inaccurate feedback in order to speed the searches the users are performing. This leads to possibly unreliable data in addition to user dissatisfaction with the search tool.

Additionally, the prior art web browsers do not request feedback on non-standard search results. Many web searches now provide non-standard search results. For example, when searching web pages, for example, for a restaurant of a specified name in a specified town, some web searches simultaneously do a phone book search for the phone number of the restaurant. This result is displayed for the user. This is a non-standard result because it is not the type of result that the user was ostensibly requesting. However, it may be useful to judge the satisfaction of the user with such non-standard results.

An additional problem in judging satisfaction with search results is that they may be used by a user without the user selecting the result (standard or non-standard) and without the user otherwise indicating through other implicit feedback that the user has found a satisfactory result. In the above example, a user who is only looking for a web page regarding the restaurant to find the phone number of the restaurant may find that phone number in a non-standard result and use that information without selecting any result, standard or non-standard.

Another drawback of the prior art is that feedback from each user is considered without reference to the user making the feedback. A user with a different experience level, language, purpose, or technical ability may have different responses to the search mechanism, however there is no way to include such differences in considering user satisfaction according to the prior art systems.

Thus, there is a need for a system and method to overcome these deficits in the prior art. The present invention addresses the aforementioned needs and solves them with additional advantages as expressed herein.

SUMMARY OF THE INVENTION

User behavior data (explicit feedback and/or implicit feedback) on a search performed on a search mechanism is collected along with the context for that user behavior data. This allows context-dependent evaluations of the quality of search mechanisms. Because both context data (describing the search) and user feedback data (the user's feedback on the search—either explicit or implicit) are collected, data necessary for an evaluation of the search is available. This information can be used, for example, to evaluate a search mechanism or to check a relevance model.

In one embodiment, context information concerning a user is collected. Such context information, in one embodiment, includes one or more of: the speed of a user's connection to the search mechanism; the type of connection; the user's self-classification of their use of the search mechanism (e.g. from among business, school, or personal use); background information concerning the user (e.g. the user's technical competency level); and language information about the language being used to perform the search.

In one embodiment, explicit feedback is not collected for each search. Rather, in one embodiment, a snooze request may be issued by a user. If a snooze request is issued, for a period of time, explicit feedback is not collected. This is done in order to enhance usability for a user, by providing a way for the user to "turn off" the explicit feedback requests, which the user may not always wish to answer at a specific time. In another embodiment, a target value for the number of requests issued to a user or for the percentage of time that explicit feedback is requested is set. Explicit feedback is requested at some times, but not requested at others, in order to attempt to approximately meet the target value for requesting explicit feedback.

In one embodiment, the explicit feedback collected includes feedback regarding satisfaction with queries in general, with results pages, and with individual results visited. Explicit feedback concerning satisfaction with individual results not visited is also collected. For example, where a number of results are presented and several results are selected and explored, explicit feedback is collected regarding a non-selected result. As another example, in a search mechanism in which a non-standard search result is presented, explicit feedback about a non-standard search result not selected is requested. Where a user performs a web search for web pages concerning a city, for example, and text including a weather report for that city is presented as a non-standard result for the search (along with standard results including web pages concerning the city), a user is asked for their explicit feedback on the weather report presented to the user.

In one embodiment, implicit feedback data collected includes: whether a requery was performed by the user, what the dwell and click time on the results page was, what the position of results clicked was (absolute position and page position), whether additional results were requested by the user (e.g. by clicking "next" for a next set of results), and destination page dwell time, page size, or page actions.

Other features of the invention are described below.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

User feedback (explicit and/or implicit) is collected along with the context for that feedback. This allows context-dependent evaluations of the quality of search mechanisms. If one search mechanism produces results that garner better feedback than a second search mechanism, it can be determined that the first search mechanism is more successful at finding results for a user. This information can be used, for example, to create a relevance model to measure the effectiveness of a search system.

In one embodiment, context-based search mechanism user feedback is captured by tracking an event stream and following a state machine in order to determine the state of the user's interaction with the browser. This allows queries to be presented to the user in order to (1) track what state the interaction is in and (2) request explicit feedback from the user. Implicit feedback, such as the amount of time spent on a page, among other implicit feedback items, is also tracked. This feedback information allows a determination to be made of whether a search result was useful in the context of the original search. Once this data has been collected, it can be analyzed to determine the quality of the search mechanism used. It can also be used to test a relevance model and see if the predictions generated by the relevance model on the quality of the results generated match the actual quality of the results as shown in implicit and/or explicit user feedback.

Thus, implicit and explicit end-user behavior is collected along with search context in order to provide increased accuracy in predicting user satisfaction.

Exemplary Computing Environment

Figure 1:
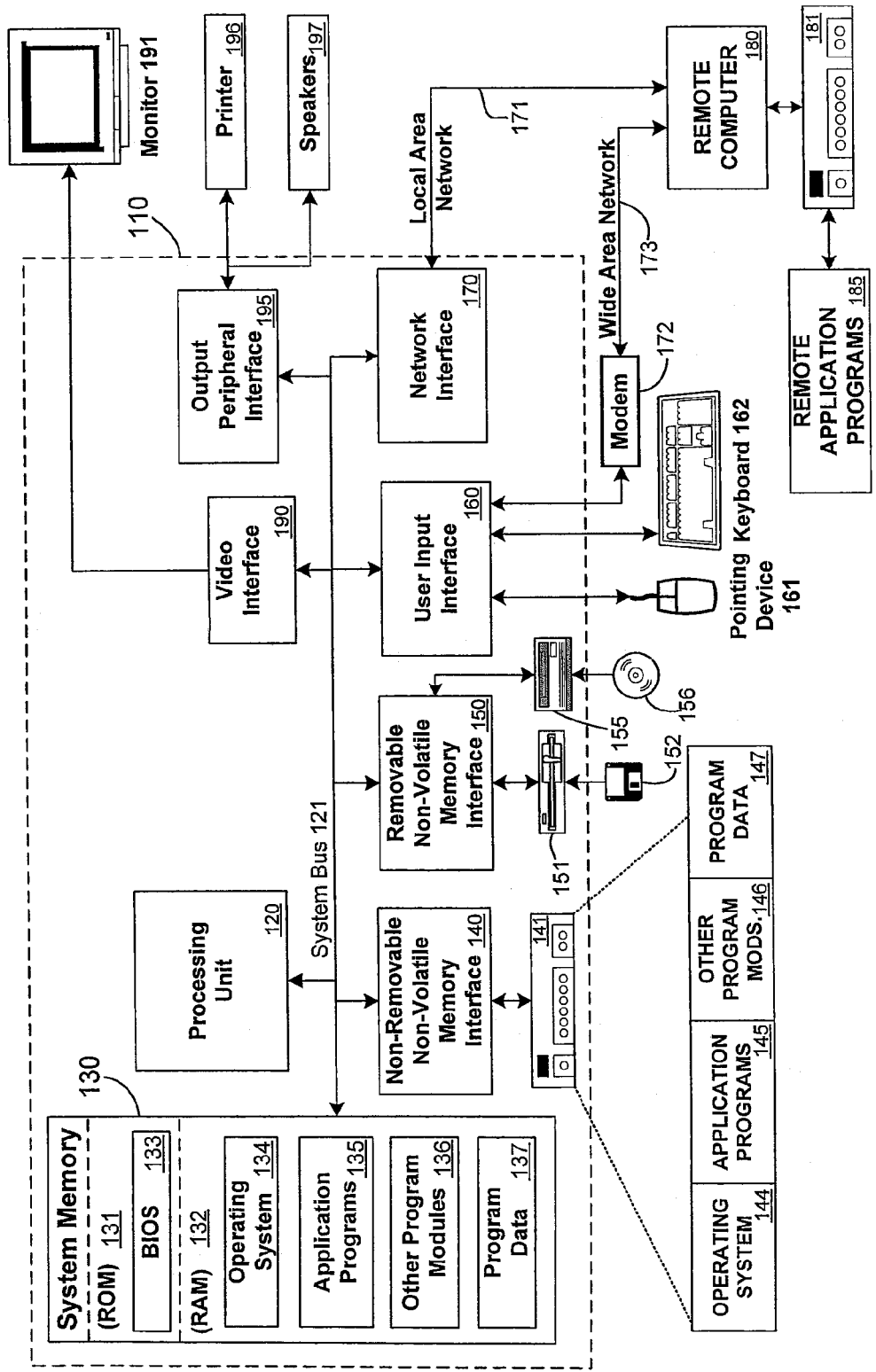
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Architecture

Figure 2:
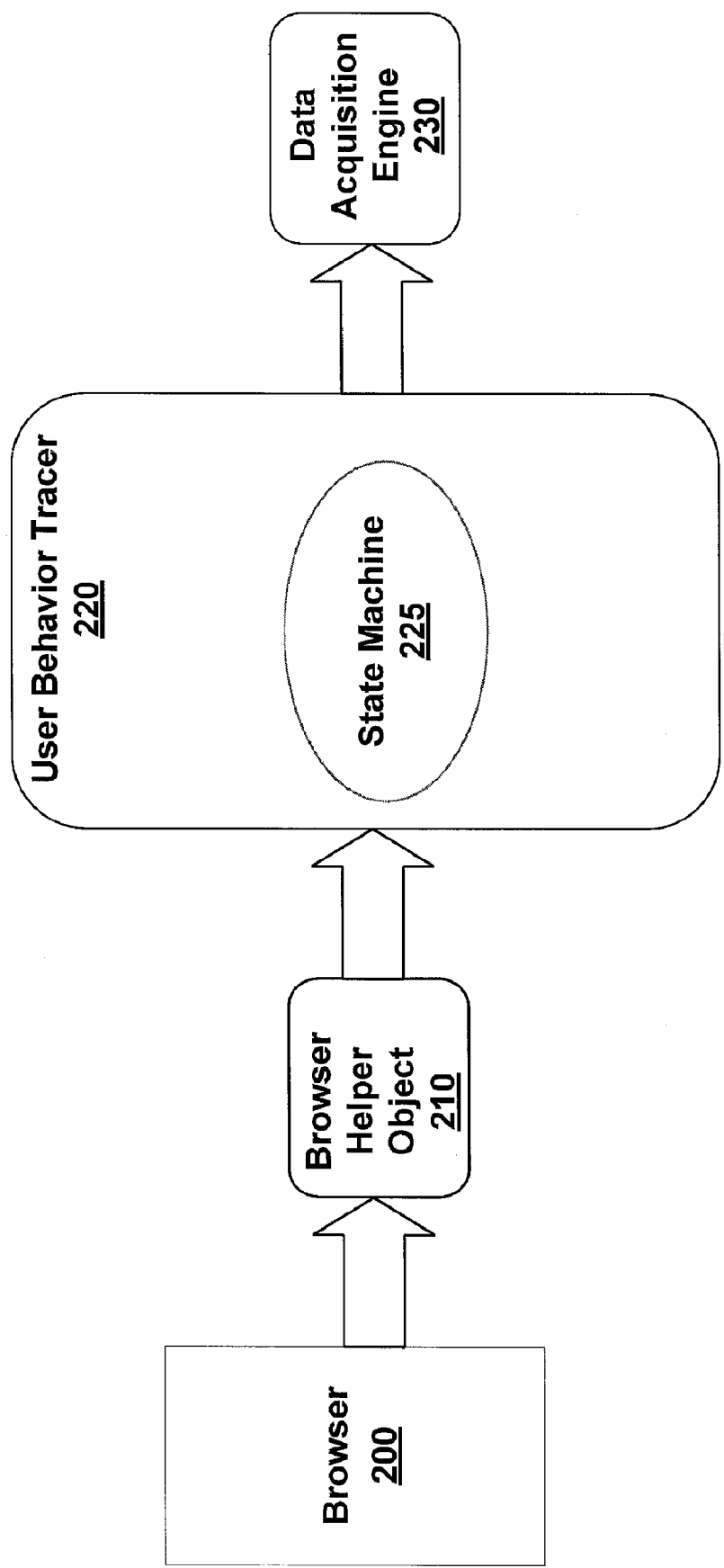
FIG. 2 is a block diagram of an example architecture according to one embodiment of the invention.

In one embodiment, the invention is implemented in or in conjunction with a web browser. A block diagram of an exemplary architecture is shown in FIG. 2. The browser, 200, is a web browser, which the user interacts with. A browser helper object 210 interfaces with the browser 200, captures browser events, and send the events to a user behavior tracer 220. The core part of user behavior tracer 220 is state machine 225. The states of the state machine 225 represent the state of the user's interaction with browser 200. For example, one state may be associated with the user having initiated a search, but not yet received a result page. The state machine 225 receives events from user behavior tracer 220, tracks the state of the user's behavior as the user uses the browser 200, and collects implicit and explicit user feedback. The user behavior tracer 220 sends data regarding the search and the feedback to the data acquisition engine 230 which stores or processes the data.

In one embodiment, a Component Object Model (COM) or similar interface in browser 200 is used to allow an in-process COM server (or equivalent) to be developed which uses the interface in browser 200. This in-process COM server or equivalent is the browser helper object 210. The browser helper object 210 can, in one embodiment, be an in-process COM component registered under a certain registry key. When browser 200 is started, it looks up that registry key and loads the object whose class ID (CLSID) is stored there. (A CLSID is a globally unique identifier that identifies a COM class object.)

Browser helper object 210 detects the browser's typical events. In some browsers, events occur (are "fired") when certain situations occur. The detection of the event can signal that certain situations have occurred in the browser. For example, such events may include events which indicate the user's navigation from page to page, such as: (1) an event which fires when a hyper link has been clicked to navigate to a different page; (2) an event which fires when the history is used for navigation to a different page; (3) an event which fires when the address bar is used to navigate to a different page; and/or (4) an event which fires when the favorites list is used to navigate to a different page.

Additionally, such events may be include events which indicate the user's use of a displayed page, such as: (5) an event which fires when a document has been completely loaded and initialized (6) an event which fires when scrolling is taking place; (7) an event which fires when a document is printed; (8) an event which fires when a document is added to the favorites list; (9) an event which fires when the window gains focus; (10) an event which fires when the window loses focus; and/or (11) an event which fires when a window has been closed. Other events may also exist and may be detected by the browser helper object 210. Some of these events may not be available in some browsers 200, and some browsers 200 may require modification in order to provide functionality for detection of these browsers.

In addition, other events may be useful for determining the user's satisfaction with a search. At least the following events may be detected by the browser helper object 210: (12) the same query performed again by a specific user, with minor modifications (requery); (13) the dwell time spent by a user on the result page; (14) the time it takes for a user to click on or otherwise select an item on the results page (click time); (15) the position of the result selected by the user on the results page; (16) whether more results are requested by the user (e.g. by selecting a "more" function on a results page or by requesting "additional results like these"); (17) the dwell time spent by the user on a result; (18) the result page size; and (19) result page actions—those actions performed on a result page, such as printing a result page.

In addition to notification of the occurrence of the corresponding activity in the browser, these events in some cases also include information about the activity. For example, when a hyperlink has been clicked (event 1) the element which has been clicked is sent as a parameter in the event.

In addition to detecting these events which signal the user's pattern of navigation and the user's use of a displayed page, browser helper object 210 can also access the browser's menu and toolbar and install hooks to monitor messages and actions which are not reflected in events. In one embodiment, these hooks are used instead of the use of events as detailed above.

Once this information is captured by the browser helper object 210, it is passed to the user behavior tracer 220. The events are used in two ways. First, the event may be stored as or used to calculate implicit feedback data. Such implicit feedback may include: data regarding the time spent on the page, mouse movements, mouse clicks, scrolling time, and query text entered. Additionally, implicit feedback may include event date and time stamps, result positions on page, link text, result URL, result click-through, result dwell-time, result printed, result added to My Favorites, scrolling activity detected on result, and whether the result was a sponsored link.

In addition to the use of the data from the browser helper object 210 for implicit feedback, the data, in one embodiment, is also used to transition from one state to another or to trigger an event in the state machine. Events in the state machine include user queries for feedback (such as feedback on a specific result or on a query in general) and user queries for state (for example, when a modified search may or may not be part of a new query, the user may be asked whether the user intended to continue the same query or start a new query.)

As stated above, in order to enable context-dependent evaluations of results of search mechanisms, context data is tracked. In one embodiment, this context data includes the state of the search, behavior data regarding the user's use of the browser 200 and, responses to user queries as to the intent of the user's behavior. Along with context data, user feedback data, either implicit or explicit, is also tracked. In one embodiment, user information is tracked. In this way, the user feedback can be used to evaluate the quality of the search mechanism in the context of the search performed. Additionally, relevance models can be evaluated as described above.

The state machine 225 works to detect the contours of a search session—when it starts, when it finishes, and what occurs during the search session. State machine 225 tracks the possible states of a search—when the user has finished the evaluation of the particular result, when the user is done with a particular query, and when questions need to be asked of users, such as what feedback the user has on a particular result item or on the query as a whole. Similar events which are detected by the browser helper object 210 may mean different things, depending on what stage of the search session has been arrived at. In order to track this, in one embodiment, state machine 225 is used to handle the complexity of search events yet maintain flexibility. The state machine design pattern is a common pattern which can be implemented, for example, as detailed in the popular "Gang of Four" book entitled *Design Patterns: Elements of Reusable Object-Oriented Software* (Erich Gamma, Richard Helm, Ralph Johnson, and John Vlissides, Addison Wesley 1994.) Other implementations of state machine 225 are contemplated, as are other implementations of the user behavior tracer 220 which do not include a state machine.

Data Recording

As discussed above, for each search, three types of data are acquired by the data acquisition engine 230 through the user behavior tracer 220.

(1) Context Data: This is data concerning the query or queries that the user used during the search. Context data can include data such as: the states of the search and associated timing, behavior data regarding the user's use of the browser 200 and responses to user queries as to the intent of the user's behavior. Generally context data allows user feedback data to be analyzed in the context of what was occurring leading to the feedback.

(2) Implicit User Feedback Data: This data reflects user behavior throughout the search session, such as page browsing, scrolling, clicking, and other user behavior. In one embodiment, timing information is also stored to describe the user behavior (As detailed above, as well as being used for implicit user feedback, data regarding user behavior is also used along with other data to drive transitions between the states in the state machine.) This behavior data is not necessarily the raw user behavior data stream sent by the browser helper object 210. In one embodiment, the raw data is interpreted and stored as four types of implicit user feedback data:

a) user behavior while visiting a result list page, including the time spent at that result;

b) user behavior while exploring a hyper link on the result list page, such as a search tip link, including the time spent at that result;

c) user behavior for visiting a result item page, including the time spent at that result and other actions such as scrolling, printing or adding the document to the user's favorites;

(in one embodiment, the active time spent at the result is measured in these three cases by subtracting any time in which the browser has lost user focus, for example when a user switches to another application)

d) Result item ignore records the user behavior for ignoring a result item, i.e. when the user does not visit a result item though it appears as part of a result list.

These correspond to some extent to states in the state machine 225, and the interpretation, in one embodiment, of raw data into interpreted user behavior data of these types occurs in the states of the state machine, while they are being traversed.

(3) Explicit User Feedback Data: This data is the explicit user feedback which has been requested about the result items the user visited and the query the user have submitted. For example, regarding a search, a query, or a specific result, the user may be asked, via a dialog box, "Did this answer your question?" and allowed to enter a response. As another example, regarding a specific result which the user ignored, the user may be asked "Why didn't you try this result?" and given choices including "I didn't think this would answer my question."

User Information

In one embodiment, user information is gathered in addition to context data, implicit user feedback data and explicit user feedback data. The user's satisfaction may be dependent on certain qualities of the user. For example, if a user is using the search mechanism for work, as opposed to recreational use, the user may be less satisfied with a search mechanism that provides interesting but whimsical search results. On the other hand, a user using the search mechanism for fun may enjoy such results. Additionally, a user using a search mechanism via a slow connection to the search mechanism may be less satisfied with a larger-sized results page (for example, a results page with graphics or streaming audio or video) whereas a user using a fast connection may not have any loss of satisfaction due to a larger-results page.

In order to take into account user qualities in determining predicted user satisfaction, the user may be requested to provide certain user information. This user information is used as part of the context-based user feedback, along with context data, implicit user feedback data, and explicit user feedback data in order to evaluate predicted user satisfaction.

Figure 3:
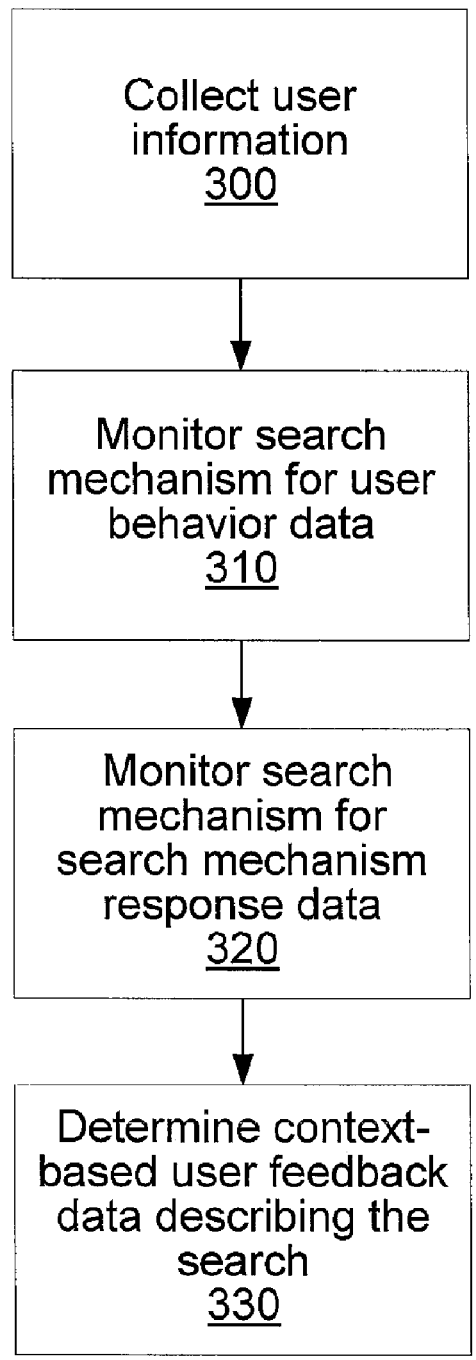
FIG. 3 is a flow diagram showing the process of gathering context-based feedback including user information according to one embodiment of the invention.

FIG. 3 is a flow diagram showing the process of gathering context-based feedback including user information according to one embodiment of the invention. In step 300, used information is collected. In step 310, the search mechanism is monitored for user behavior data regarding a search. In step 320, the search mechanism is monitored for search mechanism response data regarding the search. While these steps 300, 310 and 320 are depicted as occurring in a specific order, they could be accomplished in parallel or in any order. The data is used to determine context-based user feedback data describing the search (step 330).

User feedback information, for example, may include information regarding the speed of the user's connection to the search mechanism; the type of the user's connection to the search mechanism; a classification of the user's use of the search mechanism; background information concerning the user; and the language which the user is using to perform the search.

Collecting Explicit Feedback

As discussed above, user dissatisfaction with the collection of explicit feedback data may lead users to stop using the search mechanism which collects such data, to be dissatisfied, or to input bogus data when explicit feedback data is requested. In order to prevent such user satisfaction and the resulting problems, explicit feedback is requested only in certain circumstances.

Figure 4:
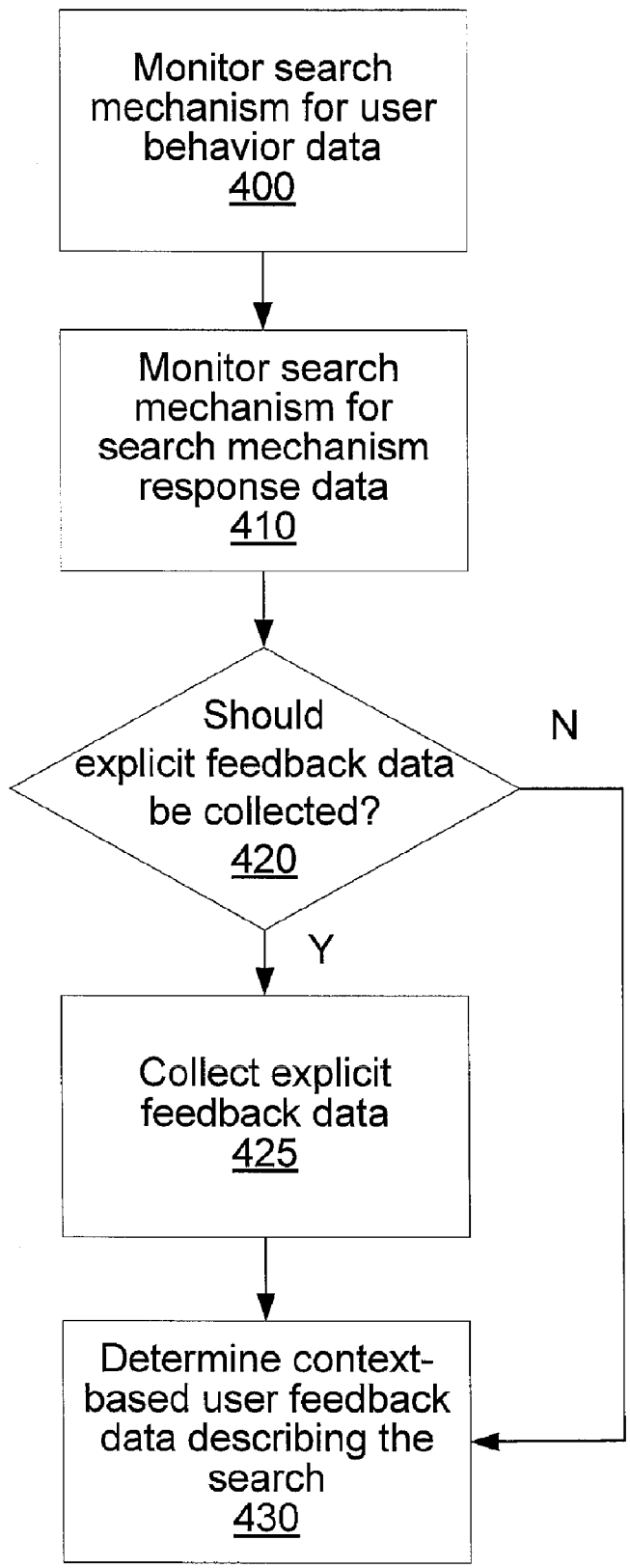
FIG. 4 is a flow diagram showing the process of gathering context-based feedback including explicit feedback according to one embodiment of the invention.

FIG. 4 is a flow diagram showing the process of gathering context-based feedback including explicit feedback according to one embodiment of the invention. In step 400, the search mechanism is monitored for user behavior data regarding a search. In step 410, the search mechanism is monitored for search mechanism response data regarding the search. In step 420 a determination is made as to whether explicit feedback data should be collected. If explicit feedback data should be collected, step 425, such explicit feedback is gathered. While these steps 400, 410 and 420/425 are depicted as occurring in a specific order, they could be accomplished in parallel or in any order. Whether or not explicit feedback is collected, afterwards the data which is collected is used to determine context-based user feedback data describing the search (step 430).

One method to make the determination as to whether explicit feedback data should be collected in step 425 is to track snooze requests from users. The snooze request allows the user to respond to a request for explicit feedback by selecting a "snooze" option. The snooze request functions as a snooze button on an alarm clock does. The requests for explicit feedback are not made to the user while the snooze request is in effect. The snooze request may be in effect for a specific number of searches, or for a specific time period, or until the next time the user launches the search mechanism.

Another method of making the determination is to have a target value for how often explicit feedback should be requested. For example, explicit feedback may be requested for approximately only a certain percentage of searches or only a certain number of times per hour or per session. Different types of explicit feedback may be requested. Each different type of feedback may have a different target value. For example, explicit feedback regarding a search result which the user selected for further exploration may be requested 100% of the time. However, as described below, explicit feedback may also be requested for a search not selected by the user for further exploration. In the example, this type of explicit feedback on non-selected results may be requested only 20% of the time. Thus, the user experience can be adjusted and user satisfaction and data integrity can be enhanced.

Collecting Explicit Feedback on Non-Selected Results

In addition to determining the user's opinion of results selected by the user for further examination, it may be useful, in determining user satisfaction with a search, to determine why a user did not select a result. A user may have found the summary of the result presented to be adequate, or may have found the result to be inapposite or not the best result from among the search results. Collecting explicit feedback on non-selected results, therefore, may be useful in determining user satisfaction. These non-selected results may include non-standard results, such as weather forecasts, maps, or phone numbers which are displayed even where a user's search is directed towards, for example, web pages.

In one embodiment, explicit feedback is collected as to all non-selected results as a whole. In another embodiment, explicit feedback is collected as to one or more specific results which were not selected. In such an embodiment, the user may be presented with a dialogue box listing three non-selected results, with radio buttons for the user to select, for each non-selected result, from among a group of possible reasons that the non-selected results were not selected. For example, for each non-selected search result, the user may be asked to complete the sentence "You did not visit the following results because you . . . " with one of three options: (1) " . . . didn't think it would answer your question"; (2) " . . . have been to this result before"; or (3) " . . . didn't look at it." Other possible options include (4) " . . . could see the information I needed from the results page" or (5) " . . . found a better result on the page."

Figure 5:
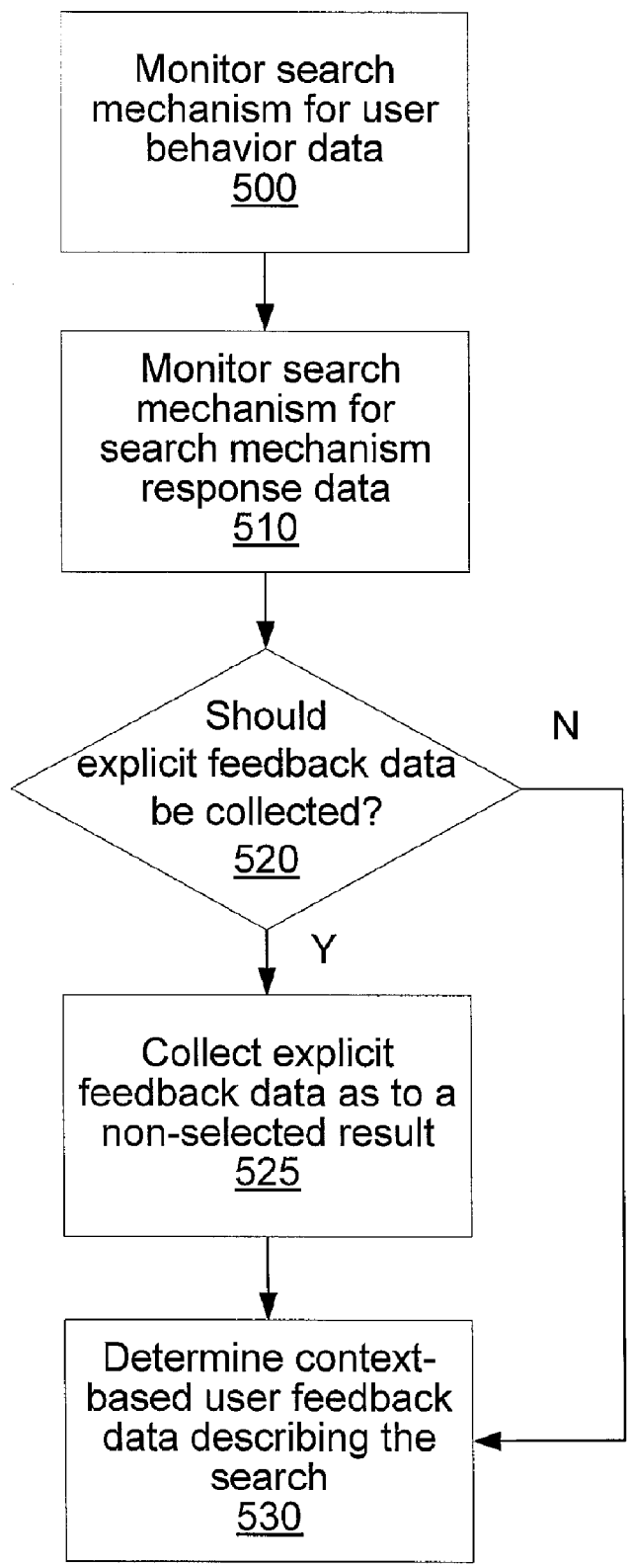
FIG. 5 is a flow diagram showing the process of gathering context-based feedback including explicit feedback on non-selected results according to one embodiment of the invention.

FIG. 5 is a flow diagram showing the process of gathering context-based feedback including explicit feedback on non-selected results according to one embodiment of the invention. In step 500, the search mechanism is monitored for user behavior data regarding a search. In step 510, the search mechanism is monitored for search mechanism response data regarding the search. In step 520 a determination is made as to whether explicit feedback data should be collected data should be collected. If explicit feedback data should be collected, step 525, such explicit feedback is gathered, including explicit feedback data as to a non-selected result. While these steps 500, 510 and 520/525 are depicted as occurring in a specific order, they could be accomplished in parallel or in any order. Where or not explicit feedback is collected, afterwards the data which is collected is used to determine context-based user feedback data describing the search (step 530).

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for improving performance of a search mechanism, which incorporates a browser for user interaction, comprising:

collecting user information;

detecting an event relating to an interaction of the user with the browser;

providing the event as input to a state machine, the state machine comprising a plurality of states, each state corresponding to a state of user interaction with the browser and a state transition function, the state transition function mapping a first state and the event to a second state, whereupon the event causes a transition of the state machine from a current state to a new state based upon the event and the state transition function;

determining context information based upon the new state of the state machine;

determining implicit user feedback data based upon the transition from the current state to the new state, wherein the implicit user feedback data reflects user behavior during a search and includes user behavior while visiting a result list page, user behavior while exploring a hyperlink on a result list page, user behavior for visiting a result item page or result item ignore behavior;

collecting explicit user feedback data by:
identifying at least one non-selected search result that is generated by the search mechanism as part of said search but that is not selected by the user; and
submitting one or more questions to the user regarding the non-selected search result and receiving explicit user feedback data to said questions, said questions prompting the user for explicit reasons why a non-selected search result failed to correspond to a search request;

utilizing the implicit user feedback data and the explicit user feedback data in light of the context information to identify a problem with the search mechanism; and correcting the problem to improve performance of the search mechanism.

2. The method of claim 1, where said user information comprises one or more of the following:
a speed of said user's connection to said search mechanism;
a type of said user's connection to said search mechanism;
a classification of said user's use of said search mechanism;
background information concerning said user; or
a language which said user is using to perform said search.

3. The method of claim 1, where said step of collecting said user information comprises:
requesting said user information from said user; and
accepting responses from said user.

4. A method for improving performance of a search mechanism, wherein the search mechanism includes a browser based on context-based user feedback data, said method comprising:
monitoring of said search mechanism for user behavior data regarding an interaction of a user with the browser to detect an event;
providing the event as input to a state machine, the state machine comprising a plurality of states, each state corresponding to a state of user interaction with the browser and a state transition function, the state transition function mapping a first state and the event to a second state, whereupon the event causes a transition of the state machine from a current state to a new state based upon the event and the state transition function;
determining context information based upon the new state of the state machine;
determining implicit user feedback data based upon the transition from the current state to the new state, wherein the implicit user feedback data reflects user behavior during a search and includes user behavior while visiting a result list page, user behavior while exploring a hyperlink on a result list page, user behavior for visiting a result item page or result item ignore behavior;
determining if a snooze request specifying a time period to suspend collection of explicit feedback data is in effect from said user, and, if not, collecting explicit feedback data from the user;
identifying at least one non-selected search result that is generated by the search mechanism as part of said search but that is not selected by the user;

acquiring explicit user feedback data describing said search by submitting one or more questions to the user regarding explicit reasons why the non-selected search result failed to correspond to the search, said explicit user feedback data comprising information regarding an extent to which a search result corresponds to a search request;

using the implicit user feedback data and the explicit user feedback data in light of the context information to identify a problem with the search mechanism; and correcting the problem to improve performance of the search mechanism.

5. The method of claim 4, where said step of determining if a snooze request is in effect from said user comprises:
determining if said user has issued a snooze request; and
determining if an associated time period associated with said snooze request has elapsed.

6. The method of claim 4, further comprising:
storing target data concerning a target value for how often explicit feedback should be collected for searches; and
allowing explicit feedback to be collected only if collecting the explicit feedback would not result in exceeding said target value for how often explicit feedback is collected.

7. A method for improving performance of a search mechanism based on context-based user feedback data, said method comprising:
detecting an event relating to an interaction of the user and a browser;
providing the event as input to a state machine, the state machine comprising a plurality of states, each state corresponding to a state of user interaction with the browser and a state transition function, the state transition function mapping a first state and the event to a second state, whereupon the event causes a transition of the state machine from a current state to a new state based upon the event and the state transition function;
determining context information based upon the new state of the state machine;
determining implicit user feedback data based upon the transition from the current state to the new state, wherein the implicit user feedback data reflects user behavior during a search and includes user behavior while visiting a result list page, user behavior while exploring a hyperlink on a result list page, user behavior for visiting a result item page or result item ignore behavior;
identifying at least one non-selected search result that is generated by the search mechanism as part of said search but that is not selected by the user;
acquiring explicit user feedback data by submitting one or more questions to the user regarding why the non-selected search result failed to correspond to the search and receiving responses to said questions;
using the implicit user feedback data and the explicit user feedback data in light of the context information to identify a problem with the search mechanism; and
correcting the problem to improve performance of the search mechanism.

8. A system for improving performance of a search mechanism based on context-based user feedback data, said system comprising:
a processor;
a memory having stored therein computer executable instructions;
a user information collector for collecting user information from a user having access to said search mechanism;

a user behavior monitor for monitoring of said search mechanism for raw user behavior data regarding an interaction of said user with said search mechanism to perform a search;

a state machine for conversion of the raw user behavior data into interpreted user behavior data and for generating context information, wherein the context information corresponds to a current state of the state machine;

an explicit user feedback data accumulator for identifying at least one non-selected search result that is generated by the search mechanism as part of said search but that is not selected by the user, the explicit user feedback data accumulator further for acquiring explicit user feedback data describing said search by submitting one or more questions to said user regarding explicit reasons why the non-selected search result failed to correspond to the search and receiving responses to said questions, said questions prompting said user for information regarding an extent to which a search result corresponds to a search request; and an analysis component for using the explicit user feedback data in light of context data to identify a problem with the search mechanism and to improve the performance of the search mechanism by correcting the problem.

9. The system of claim 8, where said user information comprises one or more of the following:

a speed of said user's connection to said search mechanism;

a type of said user's connection to said search mechanism;

a classification of said user's use of said search mechanism;

background information concerning said user; or a language which said user is using to perform said search.

10. The system of claim 8, where said user information collector requests said user information from said user and accepts responses from said user.

11. A system for improving performance of a search mechanism based on context-based user feedback data, said system comprising:

a processor;

a memory having stored therein computer executable instructions;

user behavior monitor for monitoring of said search mechanism for user behavior data regarding an interaction of a user having access to said search mechanism with said search mechanism to perform a search;

context monitor for monitoring said search mechanism for search mechanism response data regarding said search;

explicit feedback collection mechanism for making a determination of whether a snooze request specifying a time period to suspend collection of explicit feedback data is in effect from said user, and, if not, collecting explicit feedback data from said user;

an explicit user feedback data accumulator for identifying at least one non-selected search result that is generated by the search mechanism as part of said search but that is not selected by the user, the explicit user feedback data accumulator further for acquiring explicit user feedback data describing said search by submitting one or more questions to the user regarding the non-selected search result, said explicit user feedback data comprising information regarding explicit reasons why a search result failed to corresponds to a search request; and an analysis component for using the explicit user feedback data in light of context data to identify a problem with the search mechanism and to improve the performance of the search mechanism by correcting the problem.

12. The system of claim 11, where the determination of whether a snooze request is in effect from said specific user comprises:

a determination of whether said user has issued a snooze request; and a determination of whether an associated time period associated with said snooze request has elapsed.

13. The system of claim 11, where said explicit feedback collection mechanism stores target data concerning a target value for how often explicit feedback should be collected for searches; and allows explicit feedback to be collected only if collecting the explicit feedback would not result in exceeding said target value for how often explicit feedback is collected.

14. A system for improving performance of a search mechanism based on context-based user feedback data, said system comprising:

a processor;

a memory having stored therein computer executable instructions;

user behavior monitor for monitoring of said search mechanism for user behavior data regarding an interaction of a user having access to said search mechanism with said search mechanism to perform a search, said user behavior data comprising data concerning requery performed by said user, dwell time on a results page, click time on said results page, position of result clicked, more results requested by said user, result dwell time, result page size, or result page actions;

a context monitor for monitoring said search mechanism wherein the context monitor comprises a state machine, the state machine comprising a plurality of states, each state corresponding to a state of user interaction with the search mechanism and a state transition function, the state transition function mapping a first state and an event to a second state, whereupon an event generated by user interaction with the search mechanism causes a transition of the state machine from a current state to a new state based upon the event and the state transition function, wherein the context monitor determines context information based upon the new state of the state machine;

an explicit user feedback data accumulator for identifying at least one non-selected search result that is generated by the search mechanism as part of said search but that is not selected by the user, the explicit user feedback data accumulator further for acquiring explicit user feedback data describing said search by submitting one or more questions to said user regarding explicit reasons why the non-selected search result failed to correspond to the search and receiving responses to said questions; and an analysis component for using the explicit user feedback data in light of the context data to identify a problem with the search mechanism and to improve the performance of the search mechanism by correcting the problem.

* * * * *

UNITED STATES PATENT AND TRADEMARK OFFICE
CERTIFICATE OF CORRECTION

PATENT NO. : 7,590,619 B2  Page 1 of 1
APPLICATION NO. : 10/805706
DATED : September 15, 2009
INVENTOR(S) : Oliver Hurst-Hiller et al.

It is certified that error appears in the above-identified patent and that said Letters Patent is hereby corrected as shown below:

In column 13, lines 5-6, in Claim 1, delete "hyperlinik" and insert -- hyperlink --, therefor.

In column 13, lines 58-59, in Claim 4, delete "hyperlinik" and insert -- hyperlink --, therefor.

In column 14, lines 44-45, in Claim 7, delete "hyperlinik" and insert -- hyperlink --, therefor.

In column 16, line 2, in Claim 11, delete "corresponds" and insert -- correspond --, therefor.

Signed and Sealed this
Eighth Day of February, 2011

David J. Kappos
*Director of the United States Patent and Trademark Office*